United States Patent [19]

Kunii et al.

[11] Patent Number: 4,894,771
[45] Date of Patent: Jan. 16, 1990

[54] DATA BASE MANAGEMENT SYSTEM EXTENDING STRUCTURE

[75] Inventors: Hideko Kunii, Tokyo; Issei Fujishiro, Tsukuba; Yasuto Shirai; Tosiyasu Kunii, both of Tokyo, all of Japan

[73] Assignee: Ricoh Company, Ltd., Japan

[21] Appl. No.: 251,097

[22] Filed: Sep. 29, 1988

[30] Foreign Application Priority Data

Dec. 19, 1987 [JP] Japan .............................. 62-321796

[51] Int. Cl.[4] .............................................. G06F 1/00
[52] U.S. Cl. .................................. 364/200; 364/300; 364/280; 364/280.4; 364/282.1
[58] Field of Search .................... 364/200, 300, 900

[56] References Cited

U.S. PATENT DOCUMENTS 4,819,160  4/1989  Tanka et al. ........................ 364/300

OTHER PUBLICATIONS

Peter Pin-Shan Chen, "The Entity-Relationship Model-Toward a Unified View of Data", ACM Transactions on Database Systems, vol. 1, No. 1, Mar. 1976, pp. 9-36.

Jeffrey D. Ullman, "Principles of Database Systems", Computer Science Press, 1982, pp. 1-7.

ANSI/X3/SPARC Study Group on Data Base Management Systems Interim Report, Feb. 8, 1975, pp. 1-140.

Hideko S. Kunii, "DBMS with Graph Data Model for Knowledge Handling", Proceedings of FJCC '87-1987 Fall Joint Computer Conference, 1987, pp. 138-142.

Primary Examiner—Raulfe B. Zache
Attorney, Agent, or Firm—Mason, Fenwick & Lawrence

[57] ABSTRACT

A data base management system extending structure includes a data base management system and an extended data base language pre-compiler for pre-compiling an extended data base language into a data base language with which the data base management system can make an access. The extended data base language is added with a link attribute information to the data base language, where the link attribute information specifies relationships of representation objectives.

18 Claims, 5 Drawing Sheets

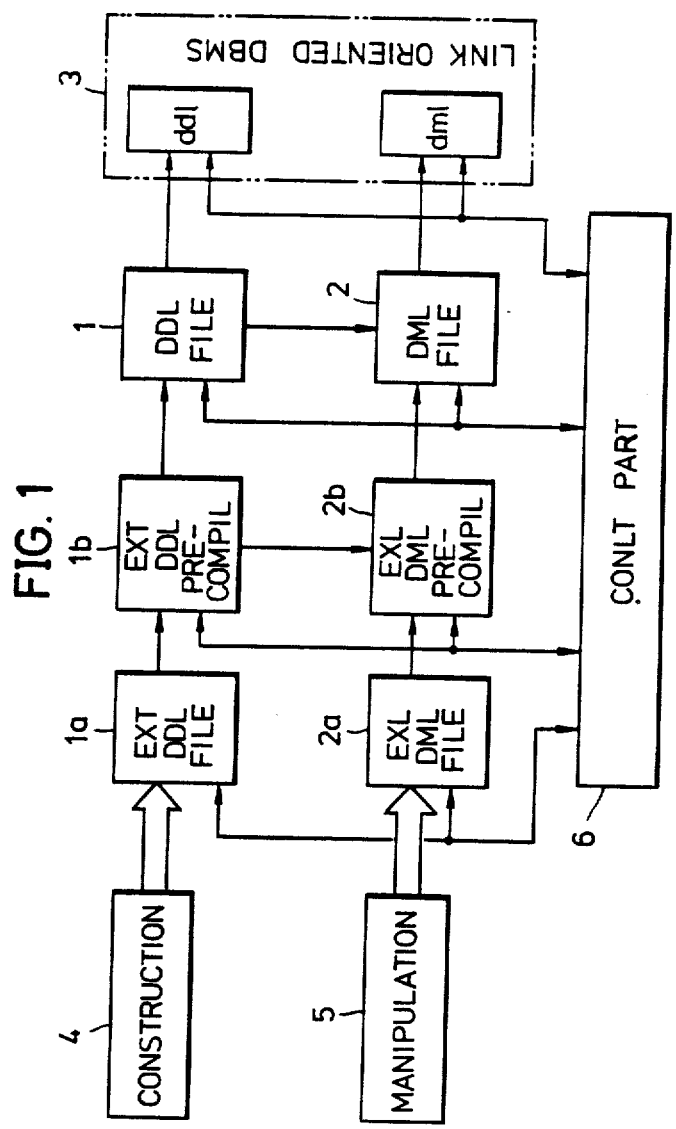

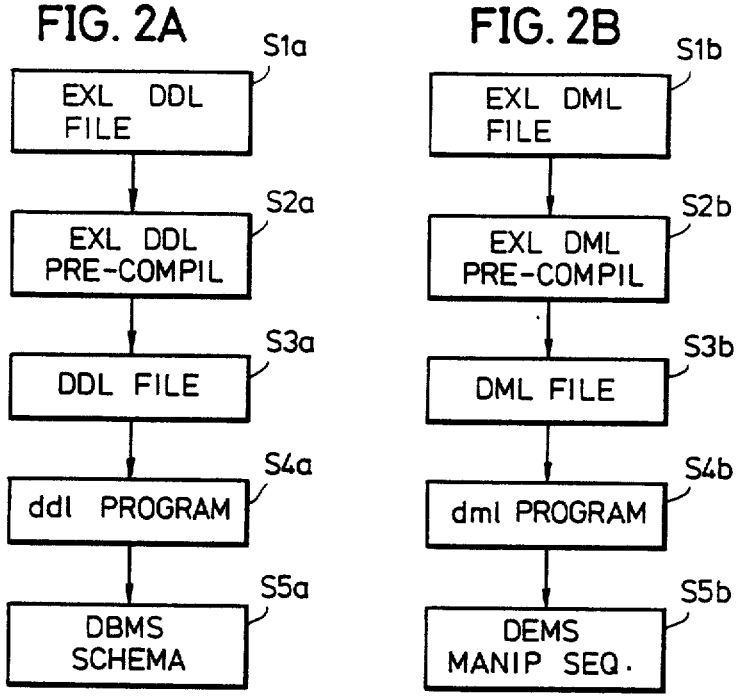

FIG. 5

```
database /usr/hvfc;

record suppliers          /* the suppliers */
(
        sname     variable character (20),  /* supplier's name */
        saddr     variable character (30)   /* supplier's address */
) key (sname);

record members            /* the members */
(
        mname     variable character (20),  /* member's name */
        maddr     variable character (30),  /* member's address */
        bal       variable decimal (4, 2)   /* member's balance */
) key (mname);

record items              /* the items handled */
(
        item      variable character (20)   /* item's name */
);
```
A

```
real link        suppliers../supply/.. items
    record
    (
                 price  variable decimal (4, 2)  /* price of the item */
    );
```

```
real link        members../order/.. items
    record
    (
                 qtty   integer (10)  /* quantity ordered */
    );
```
B

FIG. 6

```
database /usr/hvfc;

record suppliers            /* the suppliers */
(
        sname       variable character (20),  /* suppliers name */
        saddr       variable character (30)   /* supplier's address */
) key (sname) ;

record members              /* the members */
(
        mname       variable character (20),  /* member's name */
        maddr       variable character (30),  /* member's address */
        bal         variable decimal (4, 2)   /* member's balance */
) key (mname) ;

record items                /* the items handled */
(
        item        variable character (20)   /* item's name */
) ;
```
A'

```
record ggsupply
(
        sname       variable character (20),  /* supplier's name */
        item        variable character (20),  /* item's name */
        price       variable decimal (4, 2)   /* price of the item */
) key (sname, mname) ;

virtual link    suppliers (sname)../ggsupplyLink1/.. ggsupply (sname) ;
virtual link    items (item)../ggsupplyLink2/.. ggsupply (item) ;
```

```
record ggorder
(
        mname       variable character (20),  /* member's name */
        item        variable character (20),  /* item's name */
        qtty        integer (10)
) key (mname, item) ;

virtual link    members (mname)../ggorderLink1/.. ggorder (mname) ;
virtual link    items (item)../ggorderLink2/.. ggorder (item) ;
```
B'

DATA BASE MANAGEMENT SYSTEM EXTENDING STRUCTURE

BACKGROUND OF THE INVENTION

The present invention generally relates to data base management system extending structures, and more particularly to a data base management system extending structure involving pre-processing of a data model in a data base management system and extending and pre-compiling of a data base language for realizing an external view of a link-oriented data model.

The conventional relational data base control system offers data transparency, data independence, and non-procedurality of its operations. However, a generation of an optimum access path is complex and there is a disadvantage in that the access efficiency is low because of a value-based representation of relationships in a relational data model.

Accordingly, a link-oriented data base managment system based on a link-oriented data model employing a link-oriented representation of relationships has been proposed to improve the access efficiency and provide an optimum access path. The link-oriented data model represents the entities as record-types and the relationships as link-types. The link-oriented data base management system also enables the user to positively handle the relationships between objective data within the data base, thereby making it possible to convert an entity-relationship of the actual world into an internal schema.

A link-oriented data base management system called a GraphBase is commercially available. The GraphBase is based on a graph data model (GDM). The GDM is an extension of the relational data model and incorporates the structure of directed graphs, where anode corresponds to a record occurrence and an edge corresponds to a link occurrence.

Although the link-oriented data base management system enables representation of multiple corresponding relationships (many-to-many relationships) between two entities, there is a disadvantage in that it is impossible to positively handle attribute information which is inherently and directly determined by the relationships.

On the other hand, the conventional relational data model must represent both the entity and the relationship in tables, and a technique peculiar thereto is required to make a description using the relational data mode. Generally, such a description becomes extremely complex and it is virtually impossible to make a natural description.

SUMMARY OF THE INVENTION

Accordingly it is a general object of the present invention to provide a novel and useful data base management system extending structure in which the disadvantages described above are eliminated.

Another and more specific object of the present invention is to provide a data base management system extending structure based on a link-oriented data model, comprising a data base management system, an extended data base language pre-compiler for pre-compiling an input file described in an extended data base language into an output file described in a data base language with which the data base management system can make an access, and a control part for controlling operations of the data base management system and the extended data base language pre-compiler. The extended data base language is added with a link attribute information to the data base language, where the link attribute information specifies relationships of representation objectives. According to the data base management system extending structure of the present invention, an arbitrary schema restricted to the relationship of two entities can be directly represented in the extended link-oriented data model within the entity-relationship model which describes the construction of the actual world. This provides an epock-making environment for the user in designing the schema, and it becomes possible to develop a user interface for an entity-relationship diagram input.

Still another object of the present invention is to provide a data base management system extending structure based on a link-oriented data model, comprising a data base management system, an extended data definition language pre-compiler for pre-compiling an input file described in an extended data definition language into an output file described in a data definition language with which the data base management system can make an access, an extended data manipulation language pre-compiler for pre-compiling an input file described in an extended data manipulation language into an output file described in a data manipulation language with which the data base management system can make an access, and a control part for controlling operations of the data base management system, the extended data definition language pre-compiler and the extended data manipulation language pre-compiler. The extended data definition language is added with a link attribute inforamtion to the data definition language, the extended data manipulation language is added with a link attribute information to the data manipulation language, and the link attribute information specifies relationships of representation objectives. According to the data base management system extending structure of the present invention, it is possible to minimize the pre-processing of the link-oriented data model and the required processing can be carried out quickly. Furthermore, it becomes possible for the user to manipulate the conventional link-oriented data model in a natural representation.

Other objects and further features of the present invention will be apparent from the following detailed description when read in conjunction with the accompanying drawings.

BRIEF DESCRIPTION OF THE DRAWINGS

FIG. 1 is a system block diagram showing an embodiment of a data base managment system extending structure according to the present invention;

FIGS. 2A and 2B are flow charts for explaining a process of converting an external view into an internal view;

FIG. 3 shows an entity-relationship model for explaining an embodiment of an extended link-oriented data model;

FIG. 5 shows a schema description of the entity-relationship diagram of FIG. 4 in an extended data definition language (DDL); and FIG. 6 shows a schema after compiling the schema description of FIG. 5 in an extended DDL compiler.

DETAILED DESCRIPTION

Figure 4:
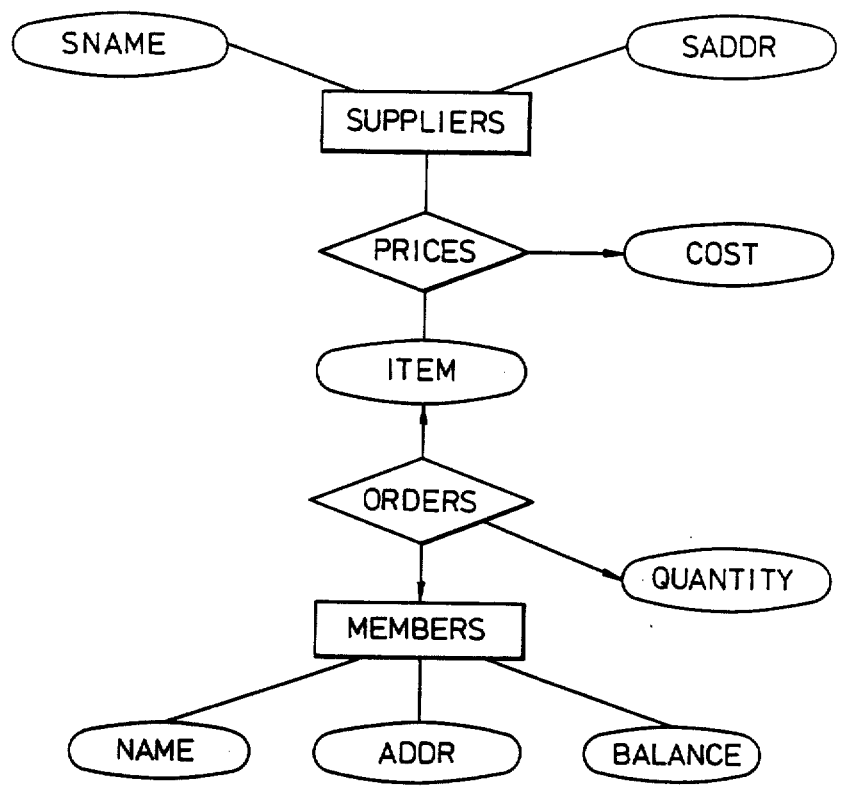
FIG. 4 shows an entity-relationship diagram for a Happy Valley Food Coop (HVFC) data base.

FIG. 1 shows an embodiment of a data base management system extending structure according to the present invention. The data base management system extending structure has a data definition language (DDL) file 1, an extended DDL file 1a, an extended DDL pre-compiler 1b, a data manipulation language (DML) file 2, an extended DML file 2a, an extended DML pre-compiler 2b, a link-oriented data base management system 3, and a control part 6. Reference numerals 4 and 5 respectively denote a construction in the actual world and a manipulation on the construction.

Conventionally, the construction 4 and the manipulation 5 were directly converted into the DDL file 1 and the DML file 2 manually. For this reason, the conversion carried out under restrictions of the representation resulted in a poor operation efficiency.

On the other hand, in the embodiment, the extended DDL file 1a described with link attribute information is provided with respect to the DDL file 1, and the extended DML file 2a described with link attribute information is provided with respect to the DML file 2. In addition, the extended DDL pre-compiler 1b and the extended DML pre-compiler 2b are provided to carry out a conversion into a language with which the link-oriented data base management system 3 can make an access. The control part 6 controls the DDL file 1, the DML file 2, the extended DDL file 1a, the extended DML file 2a, a pre-processing system made up of the extended DDL pre-compiler 1b and the extended DML pre-compiler 2b, and the link-oriented data base management system 3.

First, a description will be given of the pre-processing system made up of the extended DDL pre-compiler 1b and the extended DML pre-compiler 2b. Unlike in the case of the general programming language, the pre-processing system must carry out a schema conversion and then carry out a manipulation conversion. For this reason, the pre-processing system is roughly divided into two parts.

FIGS. 2A and 2B are flow charts for explaining a process of converting an external view into an internal view. Because the pre-processing is carried out with respect to the DDL as shown in FIG. 2A and also with respect to the DML as shown in FIG. 2B, the pre-processing will hereinafter be referred to as a double pre-compiling. The double pre-compiling is implemented as a supporting software for the data base manipulation system such as the GraphBase. The extended DDL pre-compiler 1b and the extended DML pre-compiler 2b respectively read an input file written in an extended data base language and output a file having the language thereof converted into the conventional data base language. The format of the files outputted from the extended DDL pre-compiler 1b and the extended DML pre-compiler 2b enables the supply of the files directly to the conventional processing systems.

In FIG. 2A, as may be seen from a sequence illustrated by blocks S1a through S5a, the extended DDL file is pre-compiled into a corresponding conventional DDL file by an extended DDL pre-compiling. The DDL file is further compiled by the conventional ddl (data definition language) program, thereby obtaining a data base management system (DBMS) schema.

In FIG. 2B, as may be seen from a sequence illustrated by blocks S1b through S5b, the extended DML file is pre-compiled into a corresponding conventional DML file by an extended DML pre-compiling. The DML file is further compiled by the conventional dml (data manipulation language) program, thereby obtaining a DBMS manipulation sequence.

The conventional link-oriented data base model is a data base management system on a UNIX (registered trademark), and various utilities of the UNIX can be utilized. It is natural to utilize utility programs LEX, YACC and the like for the realization of the pre-processing.

FIG. 3 shows an entity-relationship model for explaining an embodiment of an extended link-oriented data model. The entity-relationship model of P. Chen is used to describe the real link-type attributes. The following are descriptions of the extended link-oriented data model.

$R_1(f_0, f_1, \ldots, f_n)$ $f_0$:URI $R_2(g_0, \ldots, g_m)$ $g_0$:URI $L: R_1 \rightarrow R_2(at_1, at_2, \ldots, at_k)$ In the descriptions above, it is assumed that $R_i(i=1,2)$ are record-types $(R_1, R_2)$, $f_i(i=0, \ldots, n)$ and $g_j(j=0, \ldots, m)$ are fields of the record-types $R_1$ and $R_2$, and $f_0$ and $g_0$ are unique record identifiers (URI). A real link-type L is made from the record-type $R_1$ to the record-type $R_2$, and $at_i(i=1, \ldots, k)$ is permitted in the real link-type L of the link-oriented data model. Such a schema often occurs in the entity-relationship model of P. Chen.

When carrying out the conversion into the conventional link-oriented data model, each link is specified by the pair of record identifiers $f_0$ and $g_0$, and a virtual link-type is provided independently from the record-types $R_1$ and $R_2$ by preparing an intermediate record-type $R_c$ which is added with an attribute list. A resulting schema becomes as follows.

$R_c(f_0, g_0, at_1, at_2, \ldots, at_k)$ $(f_0, g_0) =$ Unique Link Identifier

Virtual $L_{v1}:R_1(\text{one}) \rightarrow R_c(\text{many})$

Virtual $L_{v2}:R_2(\text{one}) \rightarrow R_c(\text{many})$

The above described manipulation is equivalent to dividing a corresponding relationship m:n into m:1 and 1:n.

As described above, the extended link-oriented data model of the embodiment naturally represents the relationship between entities in the actual world. Hence, a useful and desirable view is provided for the user, and the conversion into the conventional data model can be carried out with ease.

The entity-relationship model can be described as follows in a virtual link-type.

$R_1(f_c, \ldots)$ $f_c$:URI $R_2(\ldots, f_c, \ldots)$

Virtual $L(f_c):R_1(\text{one}) \rightarrow R_2(\text{many})$ $(at_1, \ldots, at_n)$ Here, $R_1$ and $R_2$ are record-types, L is a virtual link made between the record-types $R_1$ and $R_2$ through a common field, and a field $f_c$ is a foreign key of the record-type $R_2$. Link attributes to be added to the virtual link-type L are listed in an attribute list $(at_1, \ldots, at_n)$. In this case, the schema can be converted with ease. An intended link attribute is added to the record-type $R_2$ as a new field. A resulting extended schema becomes as follows.

$R_1(f_c, \ldots)$ $R_2(f_c, \ldots, at_1, \ldots, at_n)$

Virtual $L(f_c):R_1(\text{one}) \rightarrow R_2(\text{many})$

This conversion of the schema is carried out similarly as described before by a double pre-compiling.

FIG. 4 shows an entity-relationship diagram for explaining an embodiment of an extended link-oriented data model. The entity-relationship diagram of FIG. 4 is for a Happy Valley Food Coop (HVFC) data base introduced in Ullman, "Principles of Database System", Computer Science Press, 1982 for the case where the extended DDL and the extended DML used in the present invention are respectively complied by the double pre-compiling and converted into the conventional DDL and the DML. The "price" and "quantity" are candidates for link attributes of two record-types which respectively are "supply" and "order".

FIG. 5 shows a schema description of the entity-relationship diagram of FIG. 4 in the extended DDL. FIG. 6 shows a schema after compiling the schema description of FIG. 5 in an extended DDL compiler. A and B shown in FIG. 5 respectively become A' and B' in FIG. 6. Accordingly, the user need only suppose the extended schema and the data base manipulation can be described in a corresponding extended DML. For example, in a case where a query is "Who supplies lettuce at a price of $1.00 or less ?", this query in the extended DML becomes as follows.

for items [item="Lettuce"]
  . . /inverse supply[price< = 1.00[/ . .
  suppliers print suppliers.sname;

This query in the extended DML is converted into the following DML statement by a processing carried out in the extended DML pre-compiler 2b.

for items[item="Lettuce"]
  . . /ggsupplyLink2/ . .ggsupply[price< = 1.00 ]
  . . /inverse ggsupplyLink1/ . .suppliers
  print suppliers.sname;

As may be readily understood from this example, the user need only suppose an extended schema and the data base manipulation can be described in a corresponding extended DML.

In other words, a complete independency is maintained between the external view and the conceptual view of the extended link-oriented data model. Hence, the 3-level schema proposed in ANSI/SPARC 1975 can be materialized.

If the user were to initially obtain the schema according to such complex queries, it would involve an extremely complex and time consuming effort especially when structuring a large data base. However, such a problem is eliminated according to the present invention.

According to the present invention, an arbitrary schema restricted to the relationship of two entities can be directly represented in the extended link-oriented data model within the entity-relationship model which describes the construction of the actual world. This provides an epock-making environment for the user in designing the schema, and it becomes possible to develop a user interface for an entity-relationship diagram input.

In addition, the double pre-compiling of the present invention can minimize the pre-processing of the link-oriented data model. Furthermore, compared to the method of developing a new data base management system based on the extended data model, the present invention provides advantages in that the cost involved in the development is considerably less and it is possible to prevent deterioration in the control efficiency.

Moreover, by providing the pre-processing system for extending the data base language and preparing a file format which can be supported by the conventional processing system, it becomes possible for the user to manipulate the conventional link-oriented data model in a natural representation.

Further, the present invention is not limited to these embodiments, but various variations and modifications may be made without departing from the scope of the present invention.

What is claimed is:

1. A data base management system extending structure based on a link-oriented data model, said data base management system extending structure comprising:
  a data base management system;
  an extended data base language pre-compiler for pre-compiling an input file described in an extended data base language into an output file described in a data base language with which said data base management system can make an access; and
  a control part for controlling operations of said data base management system and said extended data base language pre-compiler,
  said extended data base language being added with a link attribute information to the data base language, said link attribute information specifying relationships of representation objectives.

2. A data base management system extending structure as claimed in claim 1 in which said extended data base language pre-compiler has an extended data definition language pre-compiler for for pre-compiling an input file described in an extended data definition language into an output file described in a data definition language with which said data base management system can make an access and an extended data manipulation language pre-compiler for pre-compiling an input file described in an extended data manipulation language into an output file described in a data manipulation language with which said data base management system can make an access, said extended data definition language being added with the link attribute information to the data definition language, said extended data manipulation language being added with the link attribute information to the data manipulation language.

3. A data base management system extending structure as claimed in claim 2 in which said data base management system is a GraphBase.

4. A data base management system extending structure as claimed in claim 1 in which said data base management system is a GraphBase.

5. A data base management system extending structure as claimed in claim 1 which further comprises a data base language file and an extended data base language file, said extended data base language pre-compiler pre-compiling an input file of said extended data base language file described in the extended data base language into an output file described in the data base language with which said data base management system can make an access.

6. A data base management system extending structure as claimed in claim 5 in which said data base language file has a data definition language file and a data manipulation language file, and said extended data base language file has an extended data definition language file and an extended data manipulation language file.

7. A data base management system extending structure as claimed in claim 6 in which said data base management system is a GraphBase.

8. A data base management system extending structure as claimed in claim 1 in which said input file described in the extended data base language represents an extended link-oriented data model as $R_1(f_0, f_1, \ldots, f_n)$ $f_0$:URI
$R_2(g_0, g_1, \ldots, g_m)$ $g_0$:URI
$L: R_1 \rightarrow R_2(at_1, at_2, \ldots, at_k)$ where $R_i(i=1,2)$ are record-types ($R_1$, $R_2$), $f_i(i=0, \ldots, n)$ and $g_j(j=0, \ldots, m)$ are fields of the record-types $R_1$ and $R_2$, $f_0$ and $g_0$ are unique record identifiers (URI), a real link-type L is made from the record-type $R_1$ to the record-type $R_2$, and $at_i(i=1, \ldots, k)$ is permitted in the real link-type L of the link-oriented data model.

9. A data base management system extending structure as claimed in claim 8 in which said output file described in the data base language with which said data base management system can make an access represents the link-oriented data model as $R_c(f_0, g_0, at_1, at_2, \ldots, at_k)$
$(f_0, g_0)$ = Unique Link Identifier
Virtual $L_{v1}: R_1(one) \rightarrow R_c(many)$
Virtual $L_{v2}: R_2(one) \rightarrow R_c(many)$.

10. A data base management system extending structure based on a link-oriented data model, said data base management system extending structure comprising:
a data base management system;
an extended data definition language pre-compiler for pre-compiling an input file described in an extended data definition language into an output file described in a data definition language with which said data base management system can make an access;
an extended data manipulation language pre-compiler for pre-compiling an input file described in an extended data manipulation language into an output file described in a data manipulation language with which said data base management system can make an access; and
a control part for controlling operations of said data base management system, said extended data definition language pre-compiler and said extended data manipulation language pre-compiler,
said extended data definition language being added with a link attribute information to the data definition language, said extended data manipulation language being added with a link attribute information to the data manipulation language, said link attribute information specifying relationships of representation objectives.

11. A data base management system extending structure as claimed in claim 10 in which said data base management system is a GraphBase.

12. A data base management system extending structure as claimed in claim 10 in which said input file described in the extended data definition language and/or the extended data manipulation language represents an extended link-oriented data model as $R_1(f_0, f_1, \ldots, f_n)$ $f_0$:URI
$R_2(g_0, g_1, \ldots, g_m)$ $g_0$:URI
$L: R_1 \rightarrow R_2(at_1, at_2, \ldots, at_k)$ where $R_i(i=1,2)$ are record-types ($R_1$, $R_2$), $f_i(i=0, \ldots, n)$ and $g_j(j=0, \ldots, m)$ are fields of the record-types $R_1$ and $R_2$, $f_0$ and $g_0$ are unique record identifiers (URI), a real link-type L is made from the record-type $R_1$ to the record-type $R_2$, and $at_i(i=1, \ldots, k)$ is permitted in the real link-type L of the link-oriented data model.

13. A data base management system extending structure as claimed in claim 12 in which said output file described in the data definition language and/or the data manipulation language with which said data base management system can make an access represents the link-oriented data model as $R_c(f_0, g_0, at_1, at_2, \ldots, at_k)$
$(f_0, g_0)$ = Unique Link Identifier
Virtual $L_{v1}: R_1(one) \rightarrow R_c(many)$
Virtual $L_{v2}: R_2(one) \rightarrow R_c(many)$.

14. A data base management system extending structure based on a link-oriented data model, said data base management system extending structure comprising:
a data base management system;
a data definition language file described by a data definition language with which said data base management system can make an access;
a data manipulation language file described by a data manipulation language with which said data base management system can make an access;
an extended data definition language file described by the data definition language added with a link attribute information specifying relationships of representation objectives;
an extended data definition language pre-compiler for pre-compiling an input file described in the extended data definition language into an output file described in the data definition language;
an extended data manipulation language pre-compiler for pre-compiling an input file described in the extended data manipulation language into an output file described in the data manipulation language; and
a control part for controlling operations of said data base management system, said data definition language file, said data manipulation language file, said extended data definition language file, said extended data manipulation language file, said extended data definition language pre-compiler and said extended data manipulation language pre-compiler.

15. A data base management system extending structure as claimed in claim 14 in which said data base management system is a GraphBase.

16. A data base management system extending structure as claimed in claim 14 in which said input file described in the extended data definition language and/or the extended data manipulation language represents an extended link-oriented data model as $R_1(f_0, f_1, \ldots, f_n)$ $f_0$:URI
$R_2(g_0, g_1, \ldots, g_m)$ $g_0$:URI
$L: R_1 \rightarrow R_2(at_1, at_2, \ldots, at_k)$ where $R_i(i=1,2)$ are record-types ($R_1$, $R_2$), $f_i(i=0, \ldots, n)$ and $g_j(j=0, \ldots, m)$ are fields of the record-types $R_1$ and $R_2$, $f_0$ and $g_0$ are unique record identifiers (URI), a real link-type L is made from the record-type $R_1$ to the record-type $R_2$, and $at_i(i=1, \ldots, k)$ is permitted in the real link-type L of the link-oriented data model.

17. A data base management system extending structure as claimed in claim 16 in which said output file described in the data definition language and/or the data manipulation language with which said data base management system can make an access represents the link-oriented data model as $R_c(f_0, g_0, at_1, at_2, \ldots, at_k)$
$(f_0, g_0)$ = Unique Link Identifier
Virtual $L_{v1}: R_1(one) \rightarrow R_c(many)$
Virtual $L_{v2}: R_2(one) \rightarrow R_c(many)$.

18. A data base management system extending structure as claimed in claim 14 in which said defintion language file and/or said data manipulation language file describes an entity-relationship model in a virtual link-type as $R_1(f_c, \ldots)$
$f_c$:URI
$R_2(\ldots, f_c, \ldots)$
Virtual $L(f_c):R_1(\text{one}) \rightarrow R_2(\text{many})$
$(at_1, \ldots, at_n)$ where $R_1$ and $R_2$ are record-types, URI denotes a unique record identifier, L is a virtual link made between the record-types $R_1$ and $R_2$ through a common field, a field $f_c$ is a foreign key of the record-type $R_2$, and link attributes to be added to the virtual link-type L are listed in an attribute list $(at_1, \ldots, at_n)$, said extended data definition language file and/or said extended data manipulation language file adding an intended link attribute to the record-type $R_2$ as a new field thereby resulting in an extended schema $R_1(f_c, \ldots)$
$R_2(f_c, \ldots, at_1, \ldots, at_n)$
Virtual $L(f_c):R_1(\text{one}) \rightarrow R_2(\text{many})$.

* * * * *